(12) United States Patent
Hershman et al.

(10) Patent No.: US 7,472,305 B1
(45) Date of Patent: Dec. 30, 2008

(54) METHOD AND APPARATUS FOR LIMITING THE OUTPUT FREQUENCY OF AN ON-CHIP CLOCK GENERATOR

(75) Inventors: Ziv Hershman, Tel Aviv (IL); Assaf Koren, Herzlia (IL); Leonid Azriel, Haifa (IL)

(73) Assignee: National Semiconductor Corporation, Santa Clara, CA (US)

( * ) Notice: Subject to any disclaimer, the term of this patent is extended or adjusted under 35 U.S.C. 154(b) by 452 days.

(21) Appl. No.: 11/019,960

(22) Filed: Dec. 21, 2004

(51) Int. Cl.
*G06F 1/00* (2006.01)
*G06F 1/04* (2006.01)
*G06F 1/24* (2006.01)
*G06F 11/30* (2006.01)

(52) U.S. Cl. .................. 713/500; 713/501; 713/503

(58) Field of Classification Search ............ 713/500
See application file for complete search history.

(56) References Cited

U.S. PATENT DOCUMENTS 6,259,279 B1 * 7/2001 Galbraith et al. .............. 327/49
6,683,502 B1 * 1/2004 Groen et al. .................. 331/17
2005/0140571 A1 * 6/2005 Hara et al. ................... 345/3.1

* cited by examiner

*Primary Examiner*—Rehana Perveen
*Assistant Examiner*—Michael J Brown

(57) ABSTRACT

Apparatus for limiting an output signal frequency of an on-chip clock generator is presented. Electronic circuitry compares the value of a ratio between the internal clock signal frequency and the reference clock input signal frequency with minimum and maximum calibration word signals, in order to determine if the reference clock input signal frequency is within a permitted range. If the reference clock input signal frequency is not within the permitted range, the apparatus sends a tamper alert to the chip or to a system, and the output clock signal frequency is not changed according to the reference clock input signal frequency, thereby protecting the chip from erroneous or tampered clock signal. The output clock signal is buffered from the reference clock input signal insuring that the output clock signal frequency is within the permitted range. The apparatus can operate without providing the reference input clock signal.

36 Claims, 2 Drawing Sheets

METHOD AND APPARATUS FOR LIMITING THE OUTPUT FREQUENCY OF AN ON-CHIP CLOCK GENERATOR

TECHNICAL FIELD OF THE INVENTION

The present invention relates to frequency limiters and more particularly, the invention relates to a method and apparatus for limiting the output clock frequency of an on-chip clock generator.

BACKGROUND OF THE INVENTION

There are various types of digital systems comprising clock generators for timing the operation and functionality of different electronic components located on a chip or on an integrated electronic circuit. Usually, the digital system has a clock signal that serves as a reference to clock generators. This clock, usually having high stability and accuracy, is used to control a network of clocks of lower stability and is called a reference clock.

The reference clock signal usually consists of a continuous train of pulses having a constant frequency. As a result of the existence of various intentional security attacks initiated by motivated persons on the reference clock signal, the frequency of said reference clock signal may not always be stable or available and that may cause disturbances in the normal circuit or chip operation and may even cause damage to the electronic components, which are comprised in said circuit. The failure of a reference clock does not necessarily cause loss of synchronization.

It is often desirable to detect reference clock frequency deviation, caused by the intentional security attack, before it causes drastic effects to a security system by damaging it or getting it out of control. In other cases, it is often desirable to detect frequency deviations exceeding certain given minimum and maximum values. A need for such detection may arise during normal usage of the system, for example, in order to warn of actual malfunction due to frequency deviations. Alternatively, it is possible to use an internal clock signal, but this signal is not accurate since it has no reference signal.

Several devices have been proposed for limiting the frequency of the clock signal in order to protect the electronic circuit from possible deviations of the reference clock signal frequency to prevent the damage which may be caused to the electronics components. For example, European Patent No. 0048638 A2 presents a circuit that limits the frequency of pulses passing through it by deleting any input pulse which follows too closely on the preceding pulse. The output pulses cannot occur at intervals less than 16 times the period of the clock pulses. However, this patent application presents only the maximum frequency limitation, and still allows the circuit to operate at frequencies that are below the minimum. Moreover, the patent application relies on an accurate reference signal of 6.4 MHz and the output clock signal is not accurate enough.

U.S. Pat. No. 6,633,933 B2 describes a method and apparatus for limiting a processor clock frequency. The apparatus includes a frequency limiting circuit including one or more programmable fusible elements. The frequency limiting circuit outputs a signal for identifying a maximum processor clock frequency based on the state of each of the fusible elements. However, the apparatus proposed by this patent relates only to limitation of the processor clock frequency and is not suitable for any other chip. Moreover, this patent deals with the internal clock generator and it does not provide a solution to overcome the problem of external reference clock signal tampering.

U.S. Pat. No. 4,227,154 presents a frequency oscillator with a controlled limit on the frequency deviation from a synchronizing frequency. In this patent a digital counter that is driven by a stable high frequency source, generates a periodic signal synchronized to an external signal source. Gating circuitry responsive to particular digital counts, accumulated by the counter, defines precise quantized time intervals. The external signal is examined during these quantized time intervals for the occurrence of significant cyclic events, such as zero-crossing. However, the proposed circuit is too complicated and it relies on an accurate frequency source.

U.S. patent application Ser. No. 10/797,478 presents an advanced integrated frequency monitor for monitoring the frequencies of clock signals. However, this patent application does not provide a method for limitation of the clock signal frequency, but only provides a circuit for monitoring the frequencies of such clock signals and alerting in the case of deviation beyond the acceptable bounds.

U.S. Pat. No. 4,943,850 describes an apparatus for limiting the output signal frequency band of an optical sensor. A digital video color camera is presented having three solid-state image sensing devices and an analog-to-digital converter that converts the signal from the image sensing devices to a digital signal and a digital signal processing circuit that processes the output of the analog-to-digital converter. It further includes a clock oscillator that generates a first sampling clock signal used to drive the solid-state image sensing devices and a second clock signal having a frequency that is higher than the first frequency used to drive the digital signal processing circuit. An optical low-pass filter and an electrical low-pass filter have frequency characteristics chosen to depress the frequency band component. However, this patent relates only to optical sensors and only to the limitation of the output signal frequency band.

One disadvantage of the prior art is the fact that the reference clock is not buffered from the output clock. Therefore, the output clock frequency can deviate from the maximum and minimum frequencies and the average clock frequency does not match the reference clock. Furthermore, clock generation is not possible when no reference clock is enabled.

Therefore, there is a need to guarantee device immunity to security attacks, such as low and high frequency attacks and clock glitch attacks. The present invention fulfills this need and provides further related advantages, presenting a method and apparatus for limiting the output frequency of an on-chip clock generator to provide immunity to security attacks on the external reference signal frequency.

BRIEF DESCRIPTION OF THE DRAWINGS

The features and advantages of the invention will become apparent in the following description of non-limiting exemplary embodiments, with reference to the accompanying drawings, in which like reference numerals represent like parts, and in which.

DETAILED DESCRIPTION OF THE INVENTION

Figure 1A:
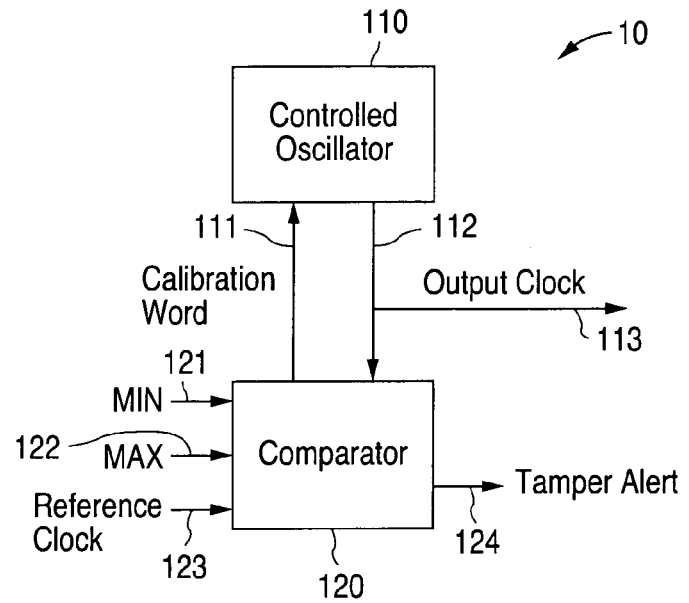
FIG. 1A illustrates a block diagram of a tamper proof clock generation circuit using a controlled oscillator according to one embodiment of the present invention.
Figure 1B:
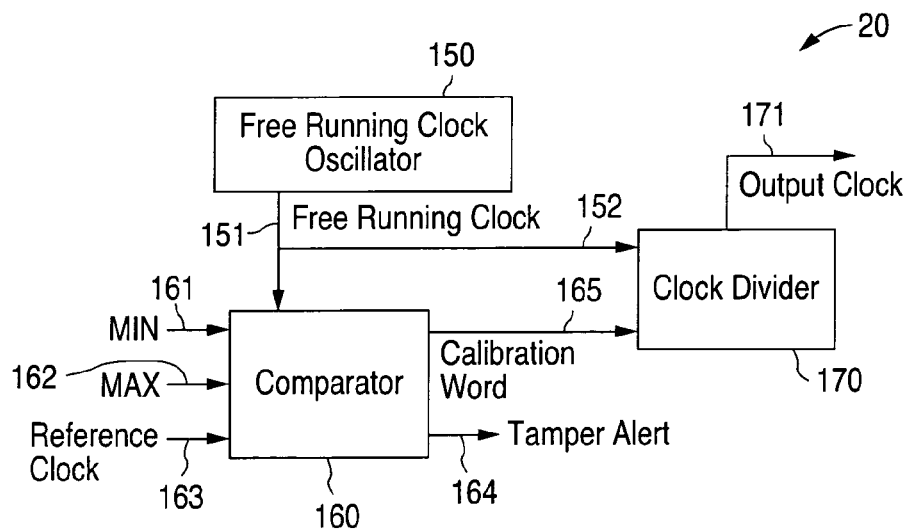
FIG. 1B illustrates a block diagram of a tamper proof clock generation circuit with a free-running clock oscillator and digital clock divider according to another embodiment of the present invention.
Figure 2:
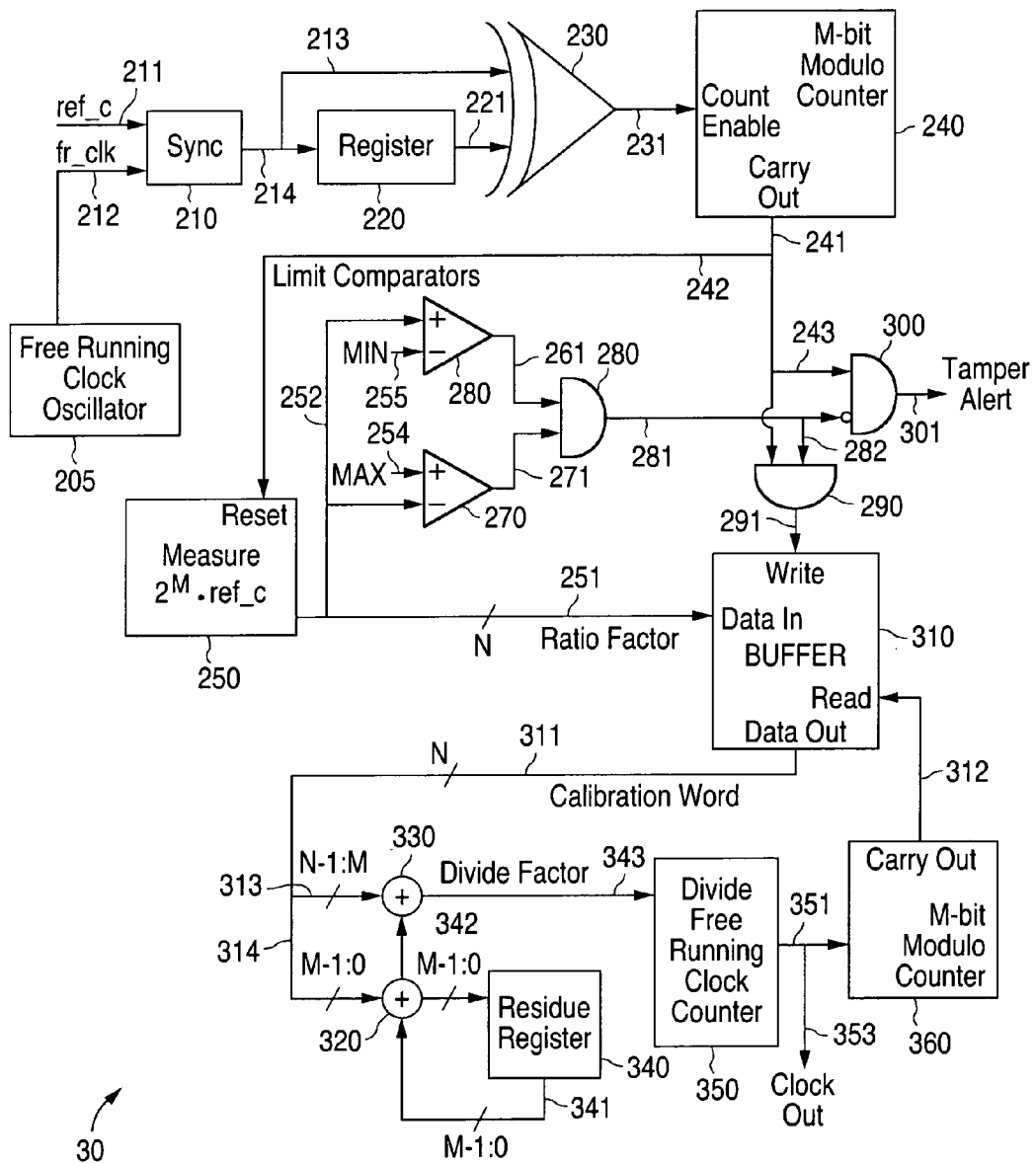
FIG. 2 illustrates a sample block diagram of clock generation circuit implementation according to one embodiment of the present invention.

FIGS. 1A through 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged clock generator.

It is an object of the present invention to provide a tamper resistance and immunity to intentional or unintentional attacks on an external reference signal.

It is another object of the present invention to provide an apparatus which includes a reference clock frequency validation circuit.

It is still another object of the present invention to provide an apparatus which uses a free running clock oscillator rather than a controlled one.

It is still a further object of the present invention to provide an apparatus which validates the reference clock rather than the output clock.

It is still a further object of the present invention to provide an apparatus which validates the reference clock before using it as a reference signal.

It is still a further object of the present invention to provide an apparatus in which the output clock signal frequency is limited by the range of high and low frequencies and cannot deviate beyond these frequencies.

It is still a further object of the present invention to provide an apparatus which maintains the output clock signal frequency within the range.

It is still a further object of the present invention to provide an apparatus having an inexpensive testing process through the production period.

Other objects and advantages of the invention will become apparent as the description proceeds.

The present invention relates to a method and apparatus for limiting the output frequency of an on-chip clock generator.

The apparatus for limiting the output frequency of a clock generator that is fabricated on a chip designed to operate with an internal clock signal being within a predetermined frequency range, and that is connected to the clock inputs of the functional components of the chip, comprises: (a) an oscillator for directly and indirectly generating the internal clock signal; and (b) an electronic circuitry, comprising a comparator at least for sensing values of minimum and maximum calibration word signals, for sensing a reference clock input signal frequency, for limiting the output clock signal frequency according to the values of the minimum and maximum calibration word signals and for outputting a tamper alert signal in the case whenever a calibration word signal value reaches the minimum or maximum calibration word signal value or in the case whenever the ratio between the frequency of the internal clock signal and the frequency of the reference clock input signal is beyond the range determined by the minimum and maximum calibration word signal values.

The method for limiting the output frequency of a clock generator that is fabricated on a chip designed to operate with an internal clock signal being within a predetermined frequency range, and that is connected to the clock inputs of the functional components of the chip, comprises: (a) providing an oscillator; (b) providing an electronic circuitry, comprising a comparator; (c) continuously generating the internal clock signal directly and indirectly by means of the oscillator; (d) continuously sensing values of minimum and maximum calibration word signals; (e) continuously sensing a reference clock input signal frequency by means of the electronic circuitry; (f) continuously limiting the output clock signal frequency according to the values of the minimum and maximum calibration word signals by means of the electronic circuitry; and (g) outputting a tamper alert signal by means of the electronic circuitry in the case whenever a calibration word signal value reaches the minimum or maximum calibration word signal value or in the case whenever the ratio between the frequency of the internal clock signal and the frequency of the reference clock input signal is beyond the range determined by the minimum and maximum calibration word signal values.

Preferably, the oscillator is a controlled oscillator.

Preferably, the oscillator is a free running clock oscillator.

Preferably, the apparatus further comprises a clock divider.

Preferably, the oscillator feeds the clock divider by means of a free running clock signal provided by the free running clock oscillator.

Preferably, the electronic circuitry controls the controlled oscillator by means of the calibration word signal.

Preferably, the controlled oscillator outputs the output clock signal, according to the calibration word signal.

Preferably, the electronic circuitry controls the clock divider by means of the calibration word signal.

Preferably, the clock divider outputs the output clock signal according to the calibration word signal provided by the electronic circuitry.

Preferably, the oscillator feeds the clock divider by means of the free running clock signal.

Preferably, the apparatus operates without the reference clock input signal by providing the input data signal by means of an external component.

Preferably, the output clock signal is buffered from the reference clock input signal.

Preferably, the output clock signal frequency is not affected by any drastic changes in the reference clock input signal frequency.

Preferably, the apparatus is tamper resistant to any intentional or unintentional attacks on the reference clock input signal.

Preferably, an average number of cycles of the reference clock input signal is identical to an average number of cycles of the output clock signal.

Preferably, the apparatus operates continuously without interruptions.

Preferably, the method comprises providing a clock divider.

Preferably, the electronic circuitry operates without the reference clock input signal by providing the input data signal by means of an external component.

Preferably, the electronic circuitry can supply a lock indication to a system or to a chip.

Preferably, the method is tamper resistant to any intentional or unintentional attacks on the reference clock input signal.

Preferably, the electronic circuitry operates continuously without interruptions.

Optionally, the apparatus can supply a lock indication to a system or to a chip.

Optionally, the electronic circuitry can supply a lock indication to a system or to a chip.

Optionally, the values of minimum and maximum calibration word signals are configured by means of software.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

It should be noted, that according to all embodiments of the present invention, wherein the word "signal" is mentioned, it may refer to more than one signal, for example, a digital word signal comprises several signals since each bit of said digital word represents a separate single signal.

FIG. 1A is a block diagram of a tamper proof clock generation circuit 10 using a controlled oscillator 110 according to one embodiment of the present invention. Controlled oscillator 110 is connected to comparator 120 via clock line 112. The comparator 120 has at least four inputs: MIN input (numbered 121), for inputting the minimum value of the calibration word signal 111, MAX input (numbered 122) for inputting the maximum value of the calibration word signal 111, a feedback input 112 for inputting a feedback of output clock signal 113 from controlled oscillator 110 and a reference clock input 123 for inputting the reference clock signal. The comparator 120 has two outputs, one of which is tamper alert signal 124 and the other is a calibration word signal 111. The controlled oscillator 110 outputs clock signal 113 according to the value of the calibration word signal 111. In this embodiment, the oscillator is controlled by a digital word issued by the comparator 120 in order to get the desirable frequency of the output clock signal 113. The clock generation circuit 10 serves as a tamper resistant electronic circuit protecting from various attacks, for example security attacks, on the reference clock signal by validating that the value of the calibration word signal 111 does not exceed certain given range of minimum and maximum values by internally comparing the value of said calibration word signal to the values of MIN 121 and MAX 122 input signals, respectively.

The comparator 120 senses minimum, maximum and reference clock input signals and generates a digital word which is the calibration word signal 111. The controlled oscillator 110 outputs the output clock signal 113 with a frequency according to the calibration word signal 111 provided by the comparator 120. The comparator limits the value of the calibration word signal 111 between the minimum and maximum values of the input signals MIN 121 and MAX 122 respectively and outputs the tamper alert signal 124 in the case when said calibration word value reaches the minimum or maximum value. The controlled oscillator 110 provides a feedback of the output clock signal 113 to the comparator 120 for controlling said controlled oscillator 110.

FIG. 1B is a block diagram of a tamper proof clock generation circuit 20 with a free-running clock and a digital clock divider according to an advantageous embodiment of the present invention. Free running oscillator 150 is connected to comparator 160 via the free running clock line 151. The comparator 160 has at least four inputs: MIN input (numbered 161) for inputting the minimum value of the calibration word signal 165, MAX input (numbered 162) for inputting the maximum value of the calibration word signal 165, a free running clock input for inputting the free running clock signal 151 and a reference clock input 163 for inputting the reference clock signal. The comparator 160 has two outputs, one of which is tamper alert 164 and the other is a calibration word signal 165. The calibration word signal 165 outgoing from the comparator 160 together with the free running clock signal 152 outgoing from free running oscillator 150 are the input signals of the clock divider 170. The clock divider 170 outputs clock signal 171 according to the division ratio defined by the calibration word signal 165. The clock generation circuit 20 serves as a tamper resistant electronic circuit protecting from various attacks, for example security attacks on the reference clock signal, by validating that the value of the calibration word signal 165 does not exceed a certain given range of minimum and maximum values by internally comparing the value of the calibration word signal to the values of MIN 161 and MAX 162 input signals, respectively.

The comparator 160 senses minimum, maximum and reference clock input signals and generates a digital word which is the calibration word signal 165. The free running clock oscillator 150 outputs the free running clock signal 151 to the comparator 160 and to the clock divider 170. The clock divider 170 outputs a frequency of the output clock signal 171 according to the value of the calibration word signal 165 provided by the comparator 160. The comparator limits the value of the calibration word signal 165 between the minimum and maximum values of the input signals MIN 161 and MAX 162, respectively, limiting as a result frequency deviation of the output clock signal 171. The comparator also outputs tamper alert signal 164 when the ratio between the frequency of free running clock signal 151 and the frequency of reference clock signal 163 deviates beyond the range defined by the values of minimum and maximum calibration word signals which are MIN 161 and MAX 162, respectively.

FIG. 2 illustrates a sample block diagram of clock generation circuit implementation 30 according to an advantageous embodiment of the present invention. Free running clock oscillator 205 has an output signal fr_clk 212. The sync block 210 synchronizes the reference clock signal 211 to the free running clock signal 212. The sync block 210 has two input signals: ref_c 211, which is the reference clock signal and fr_clk 212, which is connected to the free running clock oscillator output. In order to get at the output of the clock generation circuit 30 output clock signal frequency which is as close as possible to the provided input reference clock signal frequency, the ratio between the fr_clk signal frequency and ref_c signal frequency must be calculated. The value of the synchronized signal 214 is stored in register 220 which is, for example, a Flip-Flop. The output signal 221 of the register 220 together with the synchronized signal 213 is input to the XOR gate 230. The output signal 231 of XOR gate 230 is connected to count enable trigger of M-bit modulo counter 240. The M-bit modulo counter 240 is enabled for one cycle of fr_clk signal 212 on every change of the signal 213. The purpose of the M-bit modulo counter 240 is to generate a carry out pulse every $2^M$ changes of ref_c 211, wherein M is the number of counter bits.

The counting process is continuous and there can not be a situation wherein one or more ref_c 211 changes would not be counted or would be missed as long as the frequency of the free running clock signal (fr_clk) 212 is larger than twice the frequency of the reference clock signal (ref_c) 211. For example, if M has a value of 3 bits, then each $2^3$=8 pulses of the output XOR gate signal 231 that is equal to the number of ref_c 211 changes, the M-bit modulo counter 240 outputs "1" logic value for one cycle of fr_clk signal 212. The output signal of this counter is carry out signal 241.

Carry out signal 241 is provided through signal line 242 to serve as a synchronous reset to component 250—Measure $2^M$·ref_c, which counts the number of free running clocks in $2^M$ reference clock half cycles and measures in this manner the ratio between the free running clock signal frequency and twice the reference clock signal frequency. This ratio is represented by an N-bits Ratio Factor signal 251.

The counting process of the Measure $2^M$·ref_c component 250 begins as soon as it is reset by the carry out signal 241 coming from M-bit modulo counter 240. The ratio between the free running clock signal frequency and twice the reference clock signal frequency is actually some variable, depending on the frequencies of the ref_c and fr_clk signals. The output signal 252 of the component 250 is input to the limit comparators 260 and 270.

Each one of the limiting comparators, 260 and 270, receives at least two input signals and is used for validating and limiting the ratio between the fr_clk signal frequency and twice the ref_c signal frequency. In comparator 260 the signal 252 is input into a positive trigger and is compared to the minimum allowed ratio represented by MIN signal 255. The comparator 260 outputs signal 261 with a logic value "0" only when the value of signal 252 is smaller than the value of MIN signal 255.

In comparator 270 the signal 252 is input into a negative trigger and is compared with the maximum allowed ratio represented by MAX signal 254. The comparator 270 outputs signal 271 with a logic value "0" only when the value of signal 252 is larger than the value of MAX signal 254.

It should be noted that the possible frequency range of the input signal fr_clk 212, which is outgoing from the free running oscillator 205, is known and, therefore, the minimum and maximum values may be calculated and configured in a way that prevents false tamper detection in case of fr_clk signal frequency deviation. The output signals of these two comparators, 260 and 270, are outgoing to AND gate 280.

The logic value of signal 281 is "0" when the value of signal 252, representing the frequencies ratio, is larger than value of MAX signal 254 or smaller than value of MIN signal 255. The carry out signal 243 together with the AND gate output signal 281, are input to another AND gate 300, and the signal 281 is inverted before the input to gate 300. The output of gate 300 is a tamper alert signal 301 indicating the possible ref_c signal frequency deviation to the rest of the chip or circuits.

Also the signal 282 together with carry out signal 241 are input to an additional AND gate 290 having an output signal 291 outgoing to write trigger of the buffer 310. The purpose of this write trigger is to permit Data In 251 N-bit signal input into the buffer 310 only when the ratio between the fr_clk signal frequency and twice the ref_c signal frequency was validated to be within the permitted range.

In other cases, no Data In is input to the buffer 310. This step protects the output clock frequency of signal 353 from being erroneous and causing disturbances in normal chip or system operation or preventing damage to electronic components. The buffer 310 stores ratio measurements between the free running clock signal frequency and twice the reference clock signal frequency.

The Data Out signal 311, being the Calibration Word signal comprising N bits and expressing the ratio between the frequency of fr_clk signal 212 and twice the frequency of ref_c signal 211, is separated into two signals, one of which having M bits (M-1:0) numbered 314 and another one having N-M bits (N-1:M) numbered 313. The signal 313 is the integer part of the Calibration Word signal 311 while the signal 314 is a fractional part of the Calibration Word signal.

The value of the signal 314 is added to the value of previous M-bit residue signal 341 by means of an adder 320. The Residue register 340 samples the output of adder 320 on every change of the output clock signal 353. The value of the carry out signal 342 of adder 320 is added to the value of the signal 313 by means of an adder 330 to form a Divide Factor signal 343.

The Divide Factor signal 343 is actually a rounded integer ratio between the fr_clk signal frequency and twice the ref_c signal frequency. Divide Free Running Clock Counter 350 changes Clock Out signal 353 each (DivideFactor)·fr_clk cycles. The output of the Divide Free Running Clock Counter 350 is connected to M-bit modulo counter 360 through signal line 351. M-bit modulo counter 360 generates carry out pulse 312 every $2^M$ Clock Out 353 changes. The carry out signal 312 is a buffer read signal, which updates the Calibration Word signal 311 if valid data is available in the buffer 310; otherwise it maintains the existing Calibration Word.

If the reference clock signal 211 is stable, and the signal 251 is always within the permitted range according to values of MIN signal 255 and MAX signal 254, then for each buffer write signal 291 there is only one read signal 312. It should be noted that signal 251 together with the free running clock signal (fr_clk) 212, are the only signals that are transferred from the input of the buffer to its output preventing in this way any undesirable influences of ref_c signal frequency on clock frequency of output signal 353.

Also it should be noted, that the circuit of FIG. 2 can function independently with or without the use of any external reference clock signal. In the case that no reference clock signal 211 is provided, the buffer 310 will output a constant signal through its Data Out trigger. There is an option to provide the Data In signal 251 to the buffer 310 by means of an external component, such as CPU (Central Processing Unit) etc.

It still should be noted, that the initial default values of Data Out signal 311, MIN signal 255 and MAX signal 254 enables the correct operation of the circuit 30.

It further should be noted, that according to FIG. 2, the Ratio Factor signal 251 represents the ratio between the frequency of the fr_clk signal 212 and twice the frequency of the ref_c signal 211, but according to all embodiments of the present invention, the ratio may be calculated between the fr_clk signal frequency and other than twice the ref_c signal frequency, for example thrice the ref_c signal frequency, etc.

According to all embodiments of the present invention the proposed circuits are tamper resistant to any intentional or unintentional attacks on the reference clock signal. Also, each circuit may supply lock indication to the system or chip that means that the circuit is locked on the external clock reference signal.

According to still another advantageous embodiment of the present invention the minimum, maximum signals on FIG. 1A, FIG. 1B and FIG. 2 are configurable signals and may be changed by software. It can be useful to tighten the bounds once the circuit is locked on the external clock reference signal.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims. It is intended that the present invention encompass such changes and modifications as fall within the scope of the appended claims.

What is claimed is:

1. An apparatus for limiting an output frequency of an output clock signal from a clock generator that is fabricated on a chip designed to operate with an internal clock signal, said apparatus comprising:
    an oscillator for generating said internal clock signal; and
    electronic circuitry capable of:
        sensing minimum and maximum values of a calibration word signal,
        sensing a frequency of a reference clock input signal,
        limiting the output frequency of the output clock signal according to said minimum and maximum values of the calibration word signal, and
        outputting a tamper alert signal based on at least one of: a calibration word signal value reaching said minimum value or said maximum value, and a ratio between a frequency of said internal clock signal and the frequency of said reference clock input signal being beyond a range determined by said minimum and maximum values.

2. The apparatus according to claim 1, wherein the oscillator is a controlled oscillator.

3. The apparatus according to claim 2, wherein the electronic circuitry controls the controlled oscillator by means of the calibration word signal.

4. The apparatus according to claim 3, wherein the controlled oscillator outputs the output clock signal, according to the calibration word signal.

5. The apparatus according to claim 1, wherein the oscillator is a free running clock oscillator.

6. The apparatus according to claim 5, further comprising a clock divider.

7. The apparatus according to claim 6, wherein the oscillator feeds the clock divider by means of a free running clock signal provided by the free running clock oscillator.

8. The apparatus according to claim 6, wherein the electronic circuitry controls the clock divider by means of the calibration word signal.

9. The apparatus according to claim 8, wherein the clock divider outputs the output clock signal according to the calibration word signal provided by the electronic circuitry.

10. The apparatus according to claim 6, wherein the oscillator feeds the clock divider by means of a free running clock signal.

11. The apparatus according to claim 1, wherein said apparatus operates without the reference clock input signal by providing an input data signal by means of an external component.

12. The apparatus according to claim 1, wherein said apparatus can supply a lock indication to a system or to the chip.

13. The apparatus according to claim 1, wherein the minimum and maximum values are configured by means of software.

14. The apparatus according to claim 1, wherein the output clock signal is buffered from the reference clock input signal.

15. The apparatus according to claim 1, wherein the output frequency of the output clock signal is not affected by any drastic changes in the frequency of the reference clock input signal.

16. The apparatus according to claim 1, being tamper resistant to any intentional or unintentional attacks on the reference clock input signal.

17. The apparatus according to claim 1, wherein an average number of cycles of the reference clock input signal is identical to an average number of cycles of the output clock signal.

18. The apparatus according to claim 1, wherein said apparatus operates continuously without interruptions.

19. A method for limiting an output frequency of an output clock signal from a clock generator that is fabricated on a chip designed to operate with an internal clock signal, said method comprising:
    continuously generating said internal clock signal by means of an oscillator;
    continuously sensing minimum and maximum values of a calibration word signal;
    continuously sensing a frequency of a reference clock input signal by means of electronic circuitry;
    continuously limiting the output frequency of the output clock signal according to said minimum and maximum values by means of said electronic circuitry; and
    outputting a tamper alert signal by means of said electronic circuitry based on at least one of: a calibration word signal value reaching said minimum value or said maximum value, and a ratio between a frequency of said internal clock signal and the frequency of said reference clock input signal being beyond a range determined by said minimum and maximum values.

20. The method according to claim 19, wherein the oscillator is a controlled oscillator.

21. The method according to claim 20, wherein the electronic circuitry controls the controlled oscillator by means of the calibration word signal.

22. The method according to claim 21, wherein the controlled oscillator outputs the output clock signal, according to the calibration word signal.

23. The method according to claim 19, wherein the oscillator is a free running clock oscillator.

24. The method according to claim 23, wherein said method further comprises generating the output clock signal using a clock divider.

25. The method according to claim 24, wherein the oscillator feeds the clock divider by means of a free running clock signal provided by the free running clock oscillator.

26. The method according to claim 24, wherein the electronic circuitry controls the clock divider by means of the calibration word signal.

27. The method according to claim 26, wherein the clock divider outputs the output clock signal according to the calibration word signal provided by the electronic circuitry.

28. The method according to claim 24, wherein the oscillator feeds the clock divider by means of a free running clock signal.

29. The method according to claim 19, wherein the electronic circuitry operates without the reference clock input signal by providing an input data signal by means of an external component.

30. The method according to claim 19, wherein the electronic circuitry can supply a lock indication to a system or to a chip.

31. The method according to claim 19, wherein the minimum and maximum values are configured by means of software.

32. The method according to claim 19, wherein the output clock signal is buffered from the reference clock input signal.

33. The method according to claim 19, wherein the output frequency of the output clock signal is not affected by any drastic changes in the frequency of the reference clock input signal.

34. The method according to claim 19, being tamper resistant to any intentional or unintentional attacks on the reference clock input signal.

35. The method according to claim 19, wherein an average number of cycles of the reference clock input signal is identical to an average number of cycles of the output clock signal.

36. The method according to claim 19, wherein the electronic circuitry operates continuously without interruptions.

* * * * *